US008312511B2

(12) United States Patent
Garbow et al.

(10) Patent No.: US 8,312,511 B2
(45) Date of Patent: Nov. 13, 2012

(54) METHODS, APPARATUS AND ARTICLES OF MANUFACTURE FOR IMPOSING SECURITY MEASURES IN A VIRTUAL ENVIRONMENT BASED ON USER PROFILE INFORMATION

(75) Inventors: Zachary Adam Garbow, Rochester, MN (US); Candace Trielle Pederson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1042 days.

(21) Appl. No.: 12/046,564

(22) Filed: Mar. 12, 2008

(65) Prior Publication Data
US 2009/0235350 A1 Sep. 17, 2009

(51) Int. Cl.
G06F 7/04 (2006.01)
G06F 3/048 (2006.01)
(52) U.S. Cl. ............... 726/3; 726/15; 715/706; 715/757; 463/29; 463/31
(58) Field of Classification Search ...................... 726/15
See application file for complete search history.

(56) References Cited

U.S. PATENT DOCUMENTS

| | | | |
|---|---|---|---|
| 6,437,777 B1 | 8/2002 | Kamachi et al. | |
| 6,772,195 B1 | 8/2004 | Hatlelid et al. | |
| 6,951,516 B1 | 10/2005 | Eguchi et al. | |
| 7,143,358 B1 | 11/2006 | Yuen | |
| 7,240,368 B1 * | 7/2007 | Roesch et al. | 726/23 |
| 7,353,390 B2 * | 4/2008 | Chandley et al. | 713/168 |
| 7,690,990 B2 * | 4/2010 | Van Luchene | 463/25 |
| 7,720,733 B2 * | 5/2010 | Jung et al. | 705/35 |
| 7,841,008 B1 * | 11/2010 | Cole et al. | 726/25 |
| 8,096,882 B2 * | 1/2012 | Jung et al. | 463/42 |
| 8,099,668 B2 | 1/2012 | Garbow et al. | |
| 2002/0198940 A1 * | 12/2002 | Bower et al. | 709/204 |
| 2003/0171927 A1 * | 9/2003 | Bernard | 704/273 |
| 2003/0220980 A1 | 11/2003 | Crane | |
| 2004/0111479 A1 * | 6/2004 | Borden et al. | 709/206 |
| 2004/0153514 A1 | 8/2004 | Crane | |
| 2006/0045082 A1 | 3/2006 | Fertell et al. | |
| 2006/0212925 A1 | 9/2006 | Shull et al. | |
| 2006/0253784 A1 | 11/2006 | Bower et al. | |
| 2006/0293103 A1 | 12/2006 | Mendelsohn | |

(Continued)

OTHER PUBLICATIONS

Aggarwal, S.; Burmester, M.; Henry, P.; Kermes, L.; Mulholland, J.; Anti-Cyberstalking: The Predator and Prey Alert (PAPA) System. Systematic Approaches to Digital Forensic Engineering. Pub. Date: Nov. 2005. Relevant pp. 195-205. Found on the World Wide Web at: http://ieeexplore.ieee.org/stamp/stamp.jsp?tp=&arnumber=1592533.*

(Continued)

Primary Examiner — Nathan Flynn
Assistant Examiner — Jeremiah Avery
(74) Attorney, Agent, or Firm — Patterson & Sheridan LLP

(57) ABSTRACT

Embodiments of the invention provide techniques for integrating criminal databases with virtual worlds. The real-world identity of a user of a virtual world may be determined, e.g., by the user's network address. The user's identity may be used to search for data records of the user's criminal activities, e.g., from a police database. The retrieved data may be used to determine potential harm to other users of the virtual world from further criminal acts. Actions to prevent potential harm to other users may then be determined, including blocking access or activities available to the user, providing other users with warnings, and monitoring the avatar of the user.

24 Claims, 4 Drawing Sheets

U.S. PATENT DOCUMENTS

| | | | |
|---|---|---|---|
| 2007/0011273 | A1 | 1/2007 | Greenstein et al. |
| 2007/0013691 | A1* | 1/2007 | Jung et al. ............... 345/419 |
| 2007/0050214 | A1 | 3/2007 | Hawks et al. |
| 2007/0087756 | A1 | 4/2007 | Hoffberg |
| 2007/0111794 | A1* | 5/2007 | Hogan et al. ............... 463/42 |
| 2007/0118607 | A1* | 5/2007 | Nelissen ............... 709/217 |
| 2008/0005319 | A1 | 1/2008 | Anderholm et al. |
| 2008/0026847 | A1 | 1/2008 | Mueller et al. |
| 2008/0059198 | A1* | 3/2008 | Maislos et al. ............... 704/273 |
| 2008/0081701 | A1 | 4/2008 | Shuster |
| 2008/0133392 | A1* | 6/2008 | Jung et al. ............... 705/35 |
| 2008/0162202 | A1 | 7/2008 | Khanna et al. |
| 2008/0207327 | A1* | 8/2008 | Van Luchene et al. ......... 463/42 |
| 2009/0049513 | A1 | 2/2009 | Root et al. |
| 2009/0079816 | A1 | 3/2009 | Qvarfordt et al. |
| 2009/0113554 | A1 | 4/2009 | Zalewski |
| 2009/0132689 | A1 | 5/2009 | Zaltzman et al. |
| 2009/0150778 | A1* | 6/2009 | Nicol, II ............... 715/706 |
| 2009/0157323 | A1* | 6/2009 | Jung et al. ............... 702/19 |
| 2009/0225074 | A1 | 9/2009 | Bates et al. |

OTHER PUBLICATIONS

Rosenblum, David. What Anyone Can Know: The Privacy of Social Networking Sites. IEEE Security & Privacy. vol. 5 Issue: 3. Pub. Date: 2007. Relevant pp. 40-49. Found on the World Wide Web at: http://ieeexplore.ieee.org/stamp/stamp.jsp?tp=&arnumber=4218550.*

Aggarwal, S.; Burmester, M.; Henry, P.; Kermes, L.; Mulholland, J. Anti-Cyberstalking: The Predator and Prey Alert (PAPA) System. Systematic Approaches to Digital Forensic Engineering. Pub. Date: Nov. 2005. Relevant pp. 195-205. Found on the World Wide Web at: http://ieeexplore.ieee.org/stamp/stamp.jsp?tp=&arnumber=1592533.*

* cited by examiner

METHODS, APPARATUS AND ARTICLES OF MANUFACTURE FOR IMPOSING SECURITY MEASURES IN A VIRTUAL ENVIRONMENT BASED ON USER PROFILE INFORMATION

BACKGROUND OF THE INVENTION

1. Field of the Invention

Embodiments of the invention relate to immersive virtual environments. More specifically, embodiments of the invention relate to integrating criminal databases in an immersive virtual environment.

2. Description of the Related Art

A virtual world is a simulated environment which users may inhabit and in which the users may interact with virtual objects and locations of the virtual world. Users may also interact with one another via avatars. An avatar generally provides a graphical representation of an individual within the virtual world environment. Avatars are usually presented to other users as two or three-dimensional graphical representations of humanoids. Frequently, virtual worlds allow for multiple users to enter and interact with one another. Virtual worlds provide an immersive environment as they typically appear similar to the real world, with real world rules such as gravity, topography, locomotion, real-time actions, and communication. Communication may be in the form of text messages sent between avatars, real-time voice communication, gestures displayed by avatars, symbols visible in the virtual world, and the like.

Virtual worlds may be persistent. A persistent world provides an immersive environment (e.g., a fantasy setting used as a setting for a role-playing game, or a virtual world complete with land, buildings, towns, and economies) that is generally always available, and world events happen continually, regardless of the presence of a given avatar. Thus, unlike more conventional online games or multi-user environments, the virtual world continues to exist, and plots and events continue to occur as users enter (and exit) the virtual world.

SUMMARY OF THE INVENTION

One embodiment of the invention includes a computer-implemented method for protecting a user of a virtual world. The method generally includes: determining the real-world identity of a first user of an avatar present in a virtual world; retrieving, based on the determined real-world identity, data describing past criminal activity of the first user; determining at least one action to protect other users having avatars in the virtual world from potential harm caused by the first user; and performing the at least one action.

Another embodiment of the invention includes a computer-readable storage medium containing a plurality of definitions of inappropriate interactions between users of the virtual world, the inappropriate interactions being defined on the basis of leading to potential harm to users of the virtual world. The computer-readable storage medium also includes a program, which when executed on a processor performs an operation for protecting a user of a virtual world. The operation may generally include: determining the real-world identity of a first user of an avatar present in a virtual world; retrieving, based on the determined real-world identity, data describing past criminal activity of the first user; determining at least one action to protect other users having avatars in the virtual world from potential harm caused by the first user; and performing the at least one action.

Still another embodiment of the invention includes a system having a processor, a computer-readable storage medium and a memory. The computer-readable storage medium may contain a plurality of definitions of inappropriate interactions between users of the virtual world, the inappropriate interactions being defined on the basis of leading to potential harm to users of the virtual world. The memory may store a program, which when executed by the processor, is configured to protect a user of a virtual world. The program, when executed by the processor, is configured to perform an operation comprising: determining the real-world identity of a first user of an avatar present in a virtual world; retrieving, based on the determined real-world identity, data describing past criminal activity of the first user; determining at least one action to protect other users having avatars in the virtual world from potential harm caused by the first user; and performing the at least one action.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
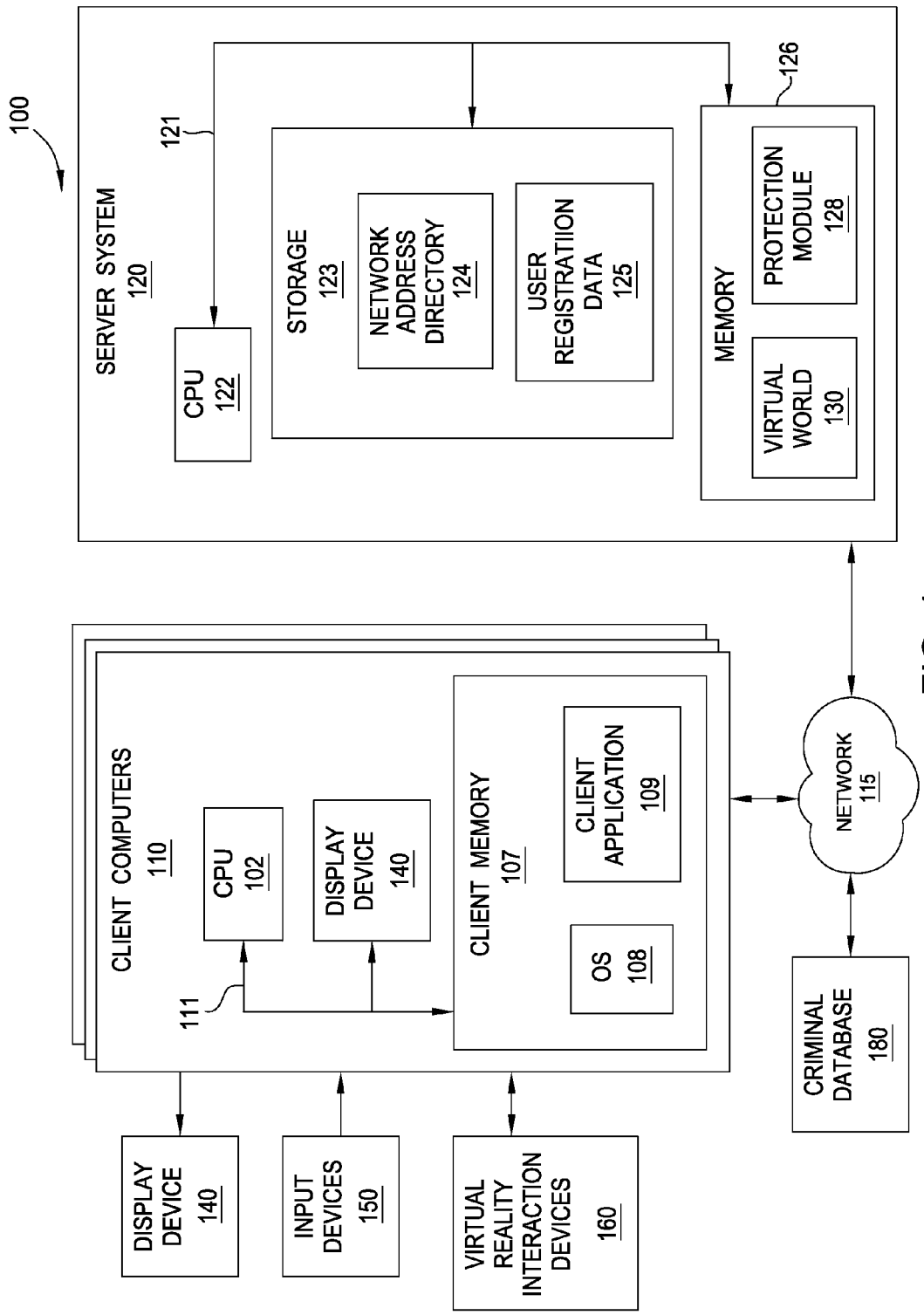
FIG. 1 is a block diagram that illustrates a client server view of an exemplary computing environment, according to one embodiment of the invention.

A virtual world is a simulated environment in which users may be represented by avatars. An avatar may be used to "travel" through locations of the virtual world, such as virtual streets, buildings, rooms, etc. While in a given location, an avatar may also be used to interact with objects or other avatars present therein. For example, an avatar may be able to approach another avatar, and may interact with the other avatar by communicating, performing financial transactions, and the like. Thus, multiple users, although in different physical locations, may be present in the same virtual location, and may interact therein by using their respective avatars.

Typically, avatars do not reveal the real-world identity of their users. That is, users may configure their avatars to display any name and appearance that they may desire. Thus, avatars enable users to interact anonymously, without revealing their real-world identity. One problem with the use of avatars in a virtual world is that a criminal may use an avatar to victimize other users, for example to perform crimes of fraud, harassment, abuse, etc. That is, the criminal user may obscure their identity by using an avatar, and may thus be able to engage in criminal activity without being identified. In contrast, in the real world, a person committing criminal acts may be more easily identified by their physical appearance, fingerprints, voice characteristics, etc.

Embodiments of the invention provide techniques for integrating criminal databases with virtual worlds. The real-world identity of a user of a virtual world may be determined, e.g., by the user's network address. The user's identity may be used to search for data records of the user's criminal activities, e.g., from a police database. The retrieved data may be used to determine potential harm to other users of the virtual world from further criminal acts. Actions to prevent potential harm to other users may then be determined, including blocking access or activities available to the user, providing other users with warnings, and monitoring the avatar of the user.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client server view of computing environment 100, according to one embodiment of the invention. As shown, computing environment 100 includes client computers 110, network 115, server system 120 and criminal database 180. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, each client computer 110 includes a central processing unit (CPU) 102, which obtains instructions and data via a bus 111 from client memory 107 and client storage 104. CPU 102 is a programmable logic device that performs all the instruction, logic, and mathematical processing in a computer. Client storage 104 stores application programs and data for use by client computer 110. Client storage 104 includes hard-disk drives, flash memory devices, optical media and the like. Client computer 110 is operably connected to the network 115.

Client memory 107 includes an operating system (OS) 108 and a client application 109. Operating system 108 is the software used for managing the operation of the client computer 110. Examples of OS 108 include UNIX, a version of the Microsoft Windows® operating system, and distributions of the Linux® operating system. (Note, Linux is a trademark of Linus Torvalds in the United States and other countries.)

In one embodiment, the client application 109 provides a software program that allows a user to connect to a virtual world 130, and once connected, to perform various user actions. Such actions may include exploring virtual locations, interacting with other avatars, and interacting with virtual objects. Further, the client application 109 may be configured to generate and display a visual representation of the user within the immersive environment, generally referred to as an avatar. The avatar of the user is generally visible to other users in the virtual world, and the user may view avatars representing the other users. The client application 109 may also be configured to generate and display the immersive environment to the user and to transmit the user's desired actions to the virtual world 130 on the server 120. Such a display may include content from the virtual world determined from the user's line of sight at any given time. For the user, the display may include the avatar of that user or may be a camera eye where the user sees the virtual world through the eyes of the avatar representing this user.

Figure 2:
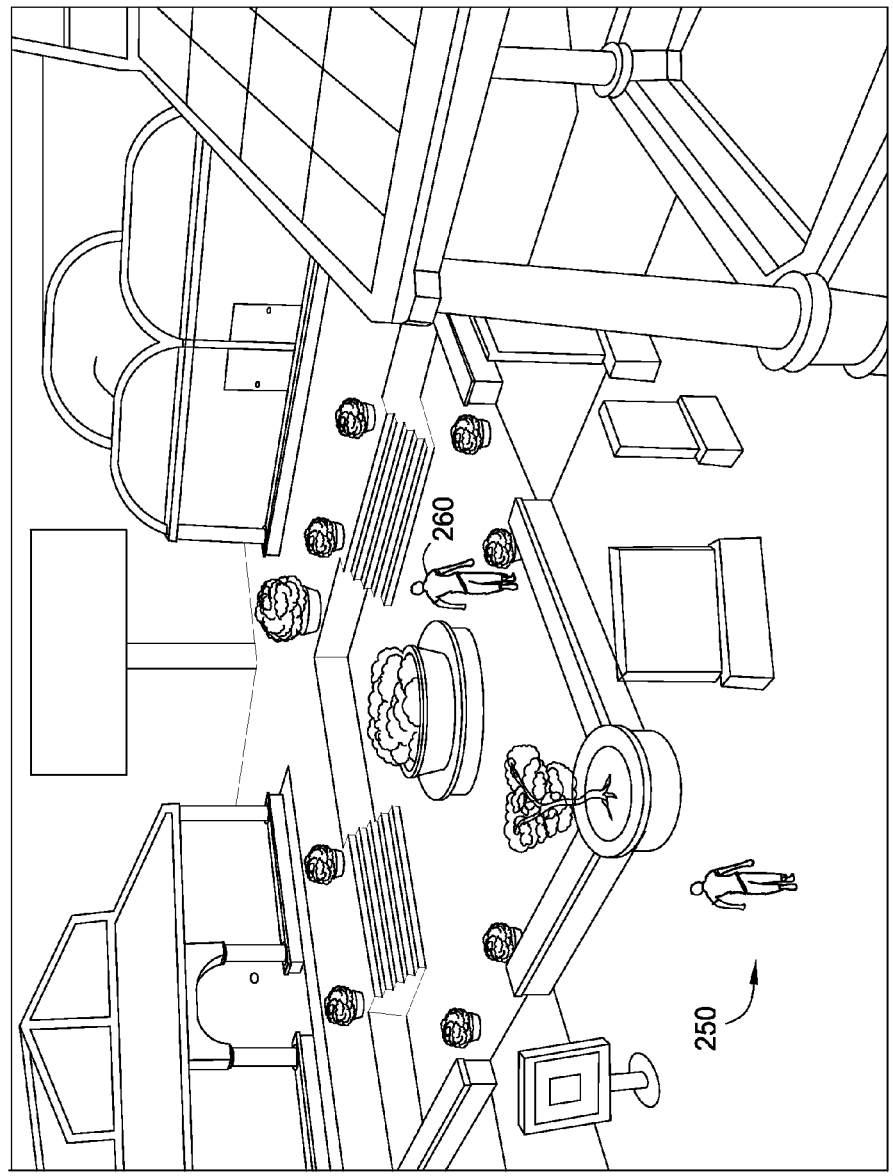
FIG. 2 illustrates a user display for a user participating in a virtual world, according to one embodiment of the invention.

By way of example, FIG. 2 illustrates a user display 200 for a user participating in a virtual world, according to one embodiment of the invention. In this example, the user is represented by avatar 250, and is present in a virtual town square. The user may interact with elements of the virtual world, including an avatar 260, which represents another user. For example, the user may control avatar 250 to initiate a contact with avatar 260, thus enabling the user to communicate with the other user. Note that avatar 250 may have a different appearance and/or name than the corresponding user. Thus, the avatar 250 may not necessarily identify the corresponding user.

Returning to FIG. 1, the user may view the virtual world using a display device 140, such as an LCD or CRT monitor display, and interact with the client application 109 using input devices 150. Further, in one embodiment, the user may interact with the client application 109 and the virtual world 130 using a variety of virtual reality interaction devices 160. For example, the user may don a set of virtual reality goggles that have a screen display for each lens. Further, the goggles could be equipped with motion sensors that cause the view of the virtual world presented to the user to move based on the head movements of the individual. As another example, the user could don a pair of gloves configured to translate motion and movement of the user's hands into avatar movements within the virtual reality environment. Of course, embodiments of the invention are not limited to these examples and one of ordinary skill in the art will readily recognize that the invention may be adapted for use with a variety of devices configured to present the virtual world to the user and to translate movement/motion or other actions of the user into actions performed by the avatar representing that user within the virtual world 130.

In one embodiment, the criminal database 180 represents any stored data that describes the criminal activities of persons. As shown, the criminal database 180 may be accessed remotely by connecting through the network 115. The criminal database 180 may be maintained by a government agency, or may be provided by private company. Thus, criminal database 180 may be, for example, a police database, a sex offender registry, a terrorist database, a credit reporting service, a private corporation's list of known "bad" customers, or a combination of any such data sources.

Figure 3:
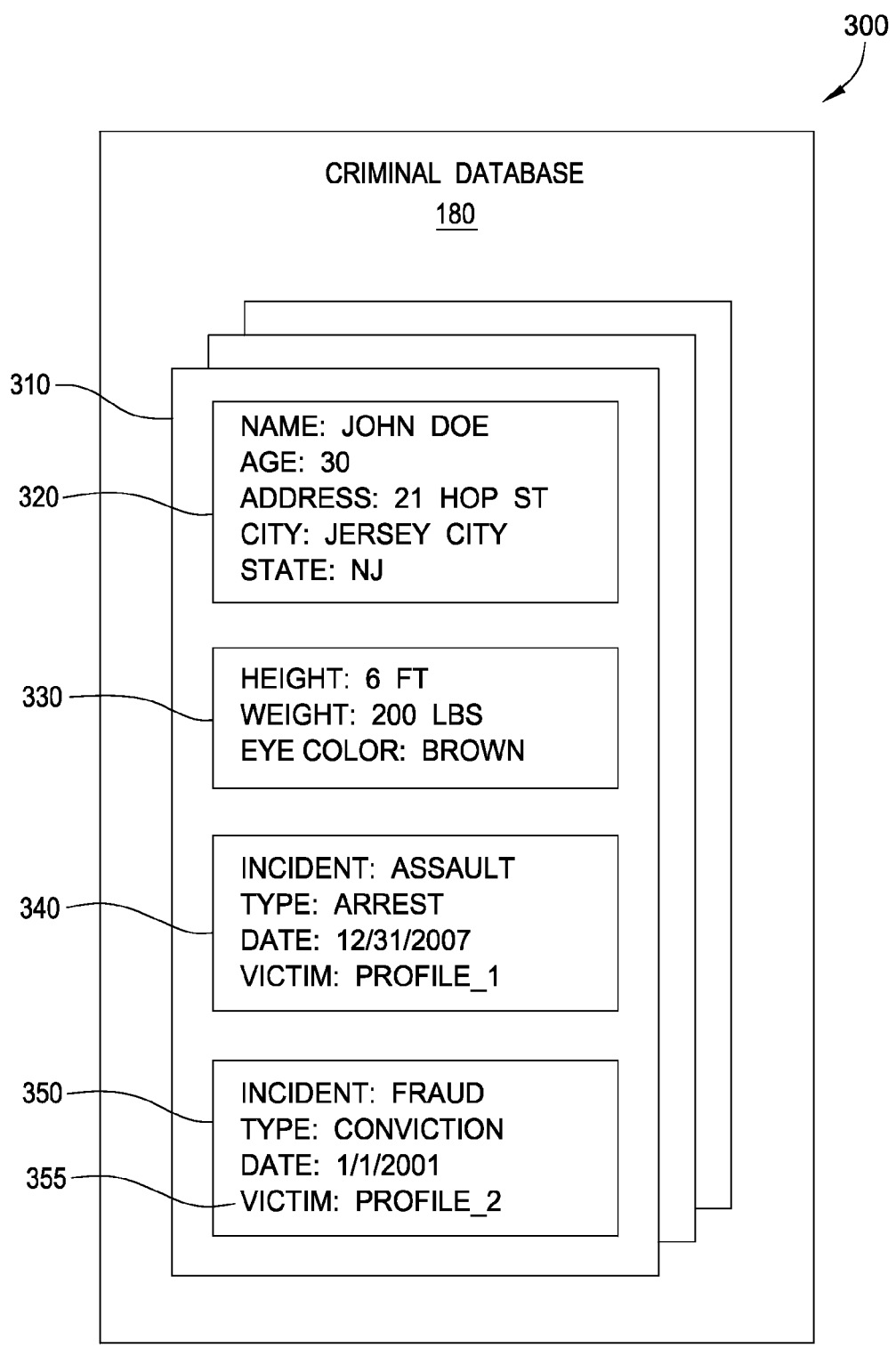
FIG. 3 is a conceptual illustration of data records included in a criminal database, according to one embodiment of the invention.

By way of example, FIG. 3 is a conceptual illustration of data records 310 included in the criminal database 180, according to one embodiment of the invention. As shown, the criminal database 180 may include multiple data records 310, each corresponding to an individual person. Each data record 310 may include data such as personal data 320, physical description 330, and data describing any criminal history for the person. In this example, the data record 310 for the person "John Doe" includes arrest data 340 relating to an assault incident, and conviction data 350 relating to a fraud incident. In one embodiment, the criminal database 180 may also include profiles of victims targeted by criminals. For example, note that the conviction data 350 includes a victim profile 355 "PROFILE_2", which may represent a standardized victim profile. Other examples of victim profiles may include "children", "women under 21 years old", a particular person, etc. Of course, this example of criminal database 180 is provided for illustrative purposes only. It is contemplated that the criminal database 180 may be organized according to any suitable schema, and may include other data fields. For example, each data record 310 may include data such as social security number, telephone number, distinguishing marks/tattoos, modus operandi, and the like.

Referring again to FIG. 1, in one embodiment, the server system 120 includes a CPU 122, which obtains instructions and data via a bus 121 from memory 126 and storage 123. The processor 122 could be any processor adapted to support the methods of the invention. The memory 126 is any memory sufficiently large to hold the necessary programs and data structures. Memory 126 could be one or a combination of memory devices, including Random Access Memory, non-volatile or backup memory, (e.g., programmable or Flash memories, read-only memories, etc.). In addition, memory 126 and storage 123 may be considered to include memory physically located elsewhere in a server 120, for example, on another computer coupled to the server 120 via bus 121. The server system 120 may be operably connected to the network 115, which generally represents any kind of data communications network. Accordingly, the network 115 may represent both local and wide area networks, including the Internet.

Memory 126 includes a virtual world 130 and a protection module 128. In one embodiment, the virtual world 130 may be a software application that allows a user to explore and interact with an immersive environment. The protection module 128 may be a software application configured to receive data from a criminal database 180 and to use the received data to protect users of the virtual world 130 from criminal activity.

In one embodiment, the protection module 128 may be configured to identify a user, and to then retrieve any data describing the identified user from the criminal database 180. That is, the protection module 128 may determine the real-life identity of a user of an avatar that is active in the virtual world 130. Alternatively, the protection module 128 may be configured to retrieve data describing multiple persons from the criminal database 180, and then to match the described persons to any users of the virtual world.

As shown, storage 123 includes network addresses directory 124 and user registration data 125. In one embodiment, the protection module 128 may be configured to determine the real-life identity of a user of an avatar by using the network addresses directory 124 and user registration data 125. For example, the protection module 128 may match a user's internet protocol (IP) address to data included in the network addresses directory 124 in order to identify the user. Further, the protection module 128 may determine the user's real-life identity by retrieving data from the user registration data 125, representing information entered by the user in registering to use the virtual world 130. Furthermore, the protection module 128 may be configured to identify a user based on other factors, such as the user's physical location (e.g., a street address), an identifier stored in the client computer 110 (e.g., a "cookie"), a user alias (e.g., a "handle" or nickname), and the like.

In one embodiment, the protection module 128 may be configured to use the data received from the criminal database 180 to determine the potential harm to other users of the virtual world 130. That is, to determine the potential harm to other users of the virtual world that could result if the user engages in behavior similar to that indicated by the received criminal history. As used herein, potential harm may include at least physical, psychological or financial harm.

In one embodiment, the protection module 128 may also be configured to take actions to protect users of the virtual world 130 from a user that is identified as having a criminal history. Such protective actions may include limiting the actions available to the identified user within the virtual world 130. For instance, the protection module 128 may block the identified user from access to particular areas of the virtual world 130. The blocked areas may be predefined as blocked, such as areas of the virtual world 130 designated for use by children. Optionally, the blocked areas may be determined dynamically. For example, the protection module 128 may be configured to determine areas of the virtual world 130 that have, at a given point in time, a higher than average number of users that match a victim profile, and to block the identified user from the determined areas. Further, the protection module 128 may block the identified user from being able to perform certain general actions, such as being able to participate in commercial transactions.

In one embodiment, the protection module 128 may also be configured to prevent the identified user from interacting with other users matching a victim profile of past criminal incidents. For example, if the identified user has a history of harassing young women, then the protection module 128 may prevent the identified user from interacting with users that are young women. Such blocked interactions may include, for example, text or vocal communications, gestures, gifts, invitations, and the like. Further, the protection module 128 may be configured to prevent the identified user from detecting potential victims. For example, the protection module 128 may prevent the identified user from perceiving characteristics of other users (e.g., gender, age, etc.) that may match the identified user's victim profile. Instead, the identified user may perceive the users matching the victim profile as having generic or non-specific avatars.

In one embodiment, the protection module 128 may also be configured to warn other users of a particular user identified as having a criminal history. Such warnings may be visual indication on the identified user's avatar. For example, the identified user's avatar, when seen by other users, may be displayed with a warning symbol, marking, color, text label, etc. Optionally, the warning may be an auditory signal, such as a sound or voice message. The warnings may be provided, for example, to any users who match the victim profile, to any users who have requested to receive such warnings, or to all other users in the virtual world 130. In one embodiment, a user may selectively configure interface options to control whether he is presented with warnings of other users having criminal histories.

In one embodiment, the protection module 128 may also be configured to monitor users identified as having a criminal history while present in the virtual world 130. Such monitoring may include, e.g., recording the user's communications with any other users of the virtual world 130, or recording the user's communications with any users matching a victim profile. The recorded may be stored, and, in the event of potential criminal acts, may be provided to authorities (e.g., police, parents, system administrators, etc.) for further action. Further, the protection module 128 may be configured to analyze the behavior of monitored users in order to detect potential criminal acts. In the event of detecting a potential criminal act, the protection module 128 may be further configured to take actions to mitigate potential harm to other users. For example, the protection module 128 may be configured to send an alert to the proper authorities, to remove the user from the virtual world, to block actions of the user, and the like.

In one embodiment, the protection module 128 may also be configured to prevent the identified user from obscuring his identity from other users. For example, the identified user may be prevented from creating multiple avatars corresponding to a single network address or user account. Also, the identified user may be prevented from changing identifying characteristics (e.g., appearance, name, etc.) of an existing avatar.

Of course, the embodiments described above are intended to be illustrative, and are not limiting of the invention. Other embodiments are broadly contemplated. For example, the criminal database 180 may be stored in the storage 123. In another example, the network address directory 124 may be provided by a remote directory accessed via the network 115.

Figure 4:
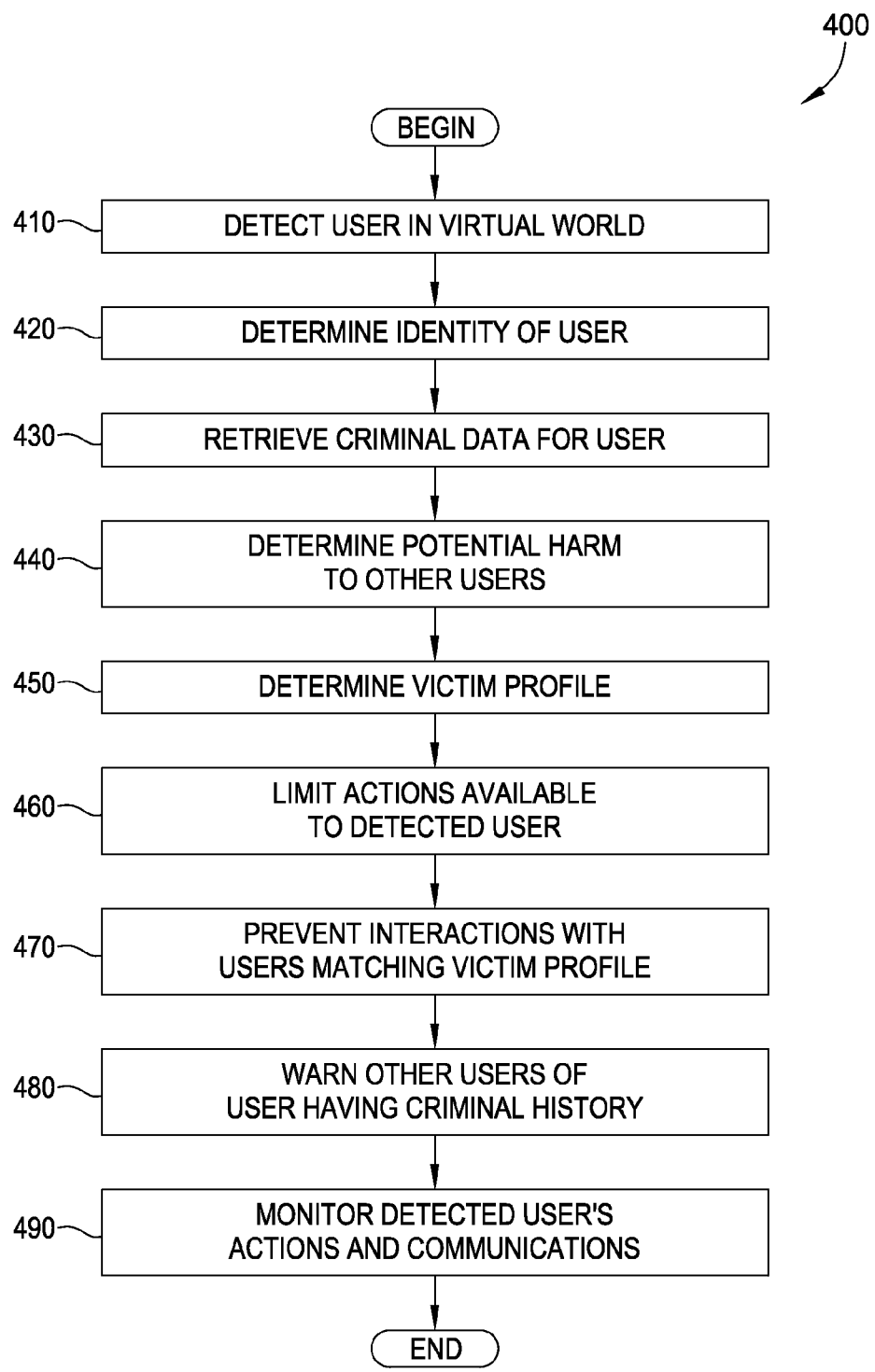
FIG. 4 is a flow diagram illustrating a method for integrating criminal databases into a virtual world, according to one embodiment of the invention.

FIG. 4 is a flow diagram illustrating a method 400 for integrating criminal databases into a virtual world, according to one embodiment of the invention. Persons skilled in the art will understand that, even though the method is described in conjunction with the system of FIG. 1, any system configured to perform the steps of the method 400, in any order, is within the scope of the present invention.

The method 400 begins at step 410, by detecting a user of an avatar present in a virtual world (e.g., virtual world 130 illustrated in FIG. 1). At step 420, the identity of the detected user may be determined. For example, the identity of the detected user may be determined by comparing the user's network address (e.g., an IP address) to a listing in the network addresses directory 124 shown in FIG. 1. In another example, the identity may be determined by retrieving identification data entered by the user, such as the user registration data 125 shown in FIG. 1.

At step 430, data records describing the criminal activities of the detected person may be retrieved. For example, protection module 128 may retrieve data records 310 stored in a criminal database 180, as illustrated in FIGS. 1-2. The criminal database 180 may represent, for example, a police database, a sex offender registry, etc. At step 440, potential harm to other users may be determined. For example, the protection module 128 may be configured to use the data received from the criminal database 180 to determine the potential harm to other users of the virtual world 130. At step 450, a victim profile may be determined. The victim profile may include characteristics of the victims of the user's criminal activities. For example, a victim profile may be determined from the data records 310, and may include characteristics such as age, gender, nationality, religion, economic level, etc.

At step 460, the actions available to the detected user may be limited. For example, the protection module 128 may block the user from access to particular areas of the virtual world 130, or may block the user from executing commercial transactions. At step 470, interactions with users matching the determined victim profile may be prevented. For example, protection module 128 may be configured to block interactions with users matching the victim profile. Such interactions may include, for example, text communications, verbal conversations, financial transactions, invitations, gifts, etc.

At step 480, other users may be provided with a warning of the user determined to have a criminal history. For example, the detected user's avatar, when seen by other users, may be displayed with a graphic warning indicator (e.g., a symbol, marking, color, text label, etc.). Optionally, the warning may be an auditory signal, such as a sound or voice message. At step 490, the actions and communications of the detected user may be monitored. For example, the protection module 128 may be configured to record the user's communications with any other users of the virtual world 130, or to record the user's communications with any users matching a victim profile. After step 490, the method 400 terminates.

Of course, method 400 is provided for illustrative purposes only, and is not intended to be limiting of the invention. It is contemplated that the steps of method 400 may be performed in a different order or combination, depending on the application. Further, method 400 may be modified to incorporate other protective actions. Such modifications may be made to suit particular situations, and are thus contemplated to be in the scope of the invention.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
   determining, by operation of one or more computer processors, the real-world identity of a first user of an avatar present in a virtual world;
   retrieving, based on the determined real-world identity, data describing at least one past criminal act of the first user, the determined real-world identity comprising at least one of a name of the first user and a physical address of the first user;
   determining, based on the at least one criminal act, at least one action to protect other users having avatars in the virtual world from potential harm caused by the first user; and
   performing the at least one action.

2. The computer-implemented method of claim 1, wherein determining the real-world identity of the first user comprises analyzing the first user's network address.

3. The computer-implemented method of claim 1, wherein determining the real-world identity of the first user is performed using data supplied by the first user in a registration process for the virtual world.

4. The computer-implemented method of claim 1, wherein the at least one action to protect other users comprises blocking the first user from access to one or more areas of the virtual world.

5. The computer-implemented method of claim 1, further comprising determining, based on the past criminal activity of the first user, a profile for victims of the past criminal activity, and wherein the at least one action to protect other users comprises blocking the first user from interacting with other users matching the determined victim profile.

6. The computer-implemented method of claim 1, wherein the at least one action to protect other users comprises providing a warning of the criminal history of the first user.

7. The computer-implemented method of claim 6, wherein providing a warning comprises marking the avatar of the first user with a visual indicator visible to other users having avatars in the virtual world.

8. The computer-implemented method of claim 1, wherein the at least one action to protect other users comprises recording a copy of any communication taking place during any interactions between the first user and other users of the virtual world.

9. A computer-readable non-transitory medium containing a program, which when executed on a processor performs an operation, comprising:
   determining the real-world identity of a first user of an avatar present in a virtual world;
   retrieving, based on the determined real-world identity, data describing at least one past criminal act of the first user, the determined real-world identity comprising at least one of a name of the first user and a physical address of the first user;
   determining, based on the at least one criminal act, at least one action to protect other users having avatars in the virtual world from potential harm caused by the first user; and
   performing the at least one action.

10. The computer-readable non-transitory medium of claim 9, wherein determining the real-world identity of the first user comprises analyzing the first user's network address.

11. The computer-readable non-transitory medium of claim 9, wherein determining the real-world identity of the first user is performed using data supplied by the first user in a registration process for the virtual world.

12. The computer-readable non-transitory medium of claim 9, wherein the at least one action to protect other users comprises blocking the first user from access to one or more areas of the virtual world.

13. The computer-readable non-transitory medium of claim 9, further comprising determining, based on the past criminal activity of the first user, a profile for victims of the past criminal activity, and wherein the at least one action to protect other users comprises blocking the first user from interacting with other users matching the determined victim profile.

14. The computer-readable non-transitory medium of claim 9, wherein the at least one action to protect other users comprises providing a warning of the criminal history of the first user.

15. The computer-readable non-transitory medium of claim 14, wherein providing a warning comprises marking the avatar of the first user with a visual indicator visible to other users having avatars in the virtual world.

16. The computer-readable non-transitory medium of claim 9, wherein the at least one action to protect other users comprises recording a copy of any communication taking place during any interactions between the first user and other users of the virtual world.

17. A system, comprising:
   a processor; and
   a memory containing a program, which when executed by the processor is configured to perform an operation comprising:
      determining the real-world identity of a first user of an avatar present in a virtual world;
      retrieving, based on the determined real-world identity, data describing at least one past criminal act of the first user, the determined real-world identity comprising at least one of a name of the first user and a physical address of the first user;
      determining, based on the at least one criminal act, at least one action to protect other users having avatars in the virtual world from potential harm caused by the first user; and
      performing the at least one action.

18. The system of claim 17, wherein determining the real-world identity of the first user comprises analyzing the first user's network address.

19. The system of claim 17, wherein determining the real-world identity of the first user is performed using data supplied by the first user in a registration process for the virtual world.

20. The system of claim 17, wherein the at least one action to protect other users comprises blocking the first user from access to one or more areas of the virtual world.

21. The system of claim 17, wherein the operation further comprises determining, based on the past criminal activity of the first user, a profile for victims of the past criminal activity, and wherein the at least one action to protect other users comprises blocking the first user from interacting with other users matching the determined victim profile.

22. The system of claim 17, wherein the at least one action to protect other users comprises providing a warning of the criminal history of the first user.

23. The system of claim 22, wherein providing a warning comprises marking the avatar of the first user with a visual indicator visible to other users having avatars in the virtual world.

24. The system of claim 17, wherein the at least one action to protect other users comprises recording a copy of any communication taking place during any interactions between the first user and other users of the virtual world.

\* \* \* \* \*